(12) United States Patent
Fukuda et al.

(10) Patent No.: US 10,585,928 B2
(45) Date of Patent: *Mar. 10, 2020

(54) LARGE SCALE FACET COUNTING ON SLICED COUNTING LISTS

(71) Applicant: International Business Machines Corporation, Armonk, NY (US)

(72) Inventors: Takashi T. Fukuda, Tokyo (JP); Hiroaki Kikuchi, Yokohama (JP); Masaki Komedani, Yokohama (JP); Shimpei Yotsukura, Yashio (JP)

(73) Assignee: International Business Machines Corporation, Armonk, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/486,518

(22) Filed: Apr. 13, 2017

(65) Prior Publication Data

US 2018/0300396 A1 Oct. 18, 2018

(51) Int. Cl.
*G06F 16/338* (2019.01)
*G06F 16/2455* (2019.01)

(52) U.S. Cl.
CPC ...... *G06F 16/338* (2019.01); *G06F 16/24554* (2019.01); *G06F 16/24561* (2019.01)

(58) Field of Classification Search
CPC .......... G06F 16/2453; G06F 16/24554; G06F 16/24561; G06F 16/278; G06F 16/338
See application file for complete search history.

(56) References Cited

U.S. PATENT DOCUMENTS

| 5,995,957 A * | 11/1999 | Beavin .............. G06F 16/24545 |
| 8,484,236 B1 * | 7/2013 | Andrews ........... G06F 16/24558 |
| | | 707/763 |
| 9,122,747 B2 | 9/2015 | Inagaki |
| 2006/0288039 A1* | 12/2006 | Acevedo-Aviles .......... G06F 16/904 |
| 2011/0137921 A1* | 6/2011 | Inagaki ............... G06F 16/3347 |
| | | 707/749 |
| 2012/0011129 A1 | 1/2012 | van Zwol et al. |
| 2012/0278321 A1 | 11/2012 | Traub et al. |

(Continued)

FOREIGN PATENT DOCUMENTS

| JP | 2014130498 A * | 7/2014 |
| JP | 2014130498 | 9/2015 |

OTHER PUBLICATIONS

"List of IBM Patents or Patent Applications Treated as Related," Letter from Leslie A. Van Leeuven, Jun. 13 2017, 1 page.

(Continued)

*Primary Examiner* — James E Richardson
(74) *Attorney, Agent, or Firm* — Van Leeuwen & Van Leeuwen; William J. Stock (57) ABSTRACT

An approach is provided in which an information handling system matches a set of documents, from a corpus of documents, to a query received from a client. The information handling system determines an amount of facets corresponding to the matching set of documents by dynamically dividing the corpus of documents into multiple sub-corpuses and performing complement facet counting on at least one of the sub-corpuses. In turn, the information handling system sends a set of results to the client that includes the determined amount of facets corresponding to the matching set of documents.

10 Claims, 8 Drawing Sheets

(56) References Cited

U.S. PATENT DOCUMENTS

| | | | |
|---|---|---|---|
| 2012/0310940 A1* | 12/2012 | Carmel | G06F 16/38 |
| | | | 707/740 |
| 2013/0060785 A1 | 3/2013 | Sweeney et al. | |
| 2014/0258277 A1* | 9/2014 | Cheng | G06F 16/245 |
| | | | 707/723 |
| 2015/0149516 A1* | 5/2015 | Iwasaki | G06F 16/1794 |
| | | | 707/827 |
| 2016/0063120 A1* | 3/2016 | Ivchenko | G06F 16/3322 |
| | | | 707/728 |
| 2016/0098433 A1 | 4/2016 | Lightner et al. | |
| 2017/0060856 A1* | 3/2017 | Turtle | G06F 16/93 |

OTHER PUBLICATIONS

Fukuda et al., "Large Scale Facet Counting on Sliced Counting Lists," U.S. Appl. No. 15/621,595, filed Jun. 13, 2017, 33 pages.

* cited by examiner

LARGE SCALE FACET COUNTING ON SLICED COUNTING LISTS

BACKGROUND

Text analytics on large document sets has increased in demand due to the increasing availability of big data. Documents included in the large document sets typically include facets that characterize a document's contents by including category labels, characteristic words, and tag information. The text analytics usually involves counting the facets in real-time for many different combinations of documents in the large document sets.

To perform facet counting, a computer system identifies documents that match a query, and then determines a number of facets, typically on a per facet category basis, that are included in the set of matching documents. The computer system then provides the results in an order based on the amount of facets found in each facet category. Depending on the size of the document set, the computer system may utilize a significant amount of resource to comb through each document in an effort to achieve a high degree of facet counting accuracy.

BRIEF SUMMARY

According to one embodiment of the present disclosure, an approach is provided in which an information handling system matches a set of documents, from a corpus of documents, to a query received from a client. The information handling system determines an amount of facets corresponding to the matching set of documents by dynamically dividing the corpus of documents into multiple sub-corpuses and performing complement facet counting on at least one of the sub-corpuses. In turn, the information handling system sends a set of results to the client that includes the determined amount of facets corresponding to the matching set of documents.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
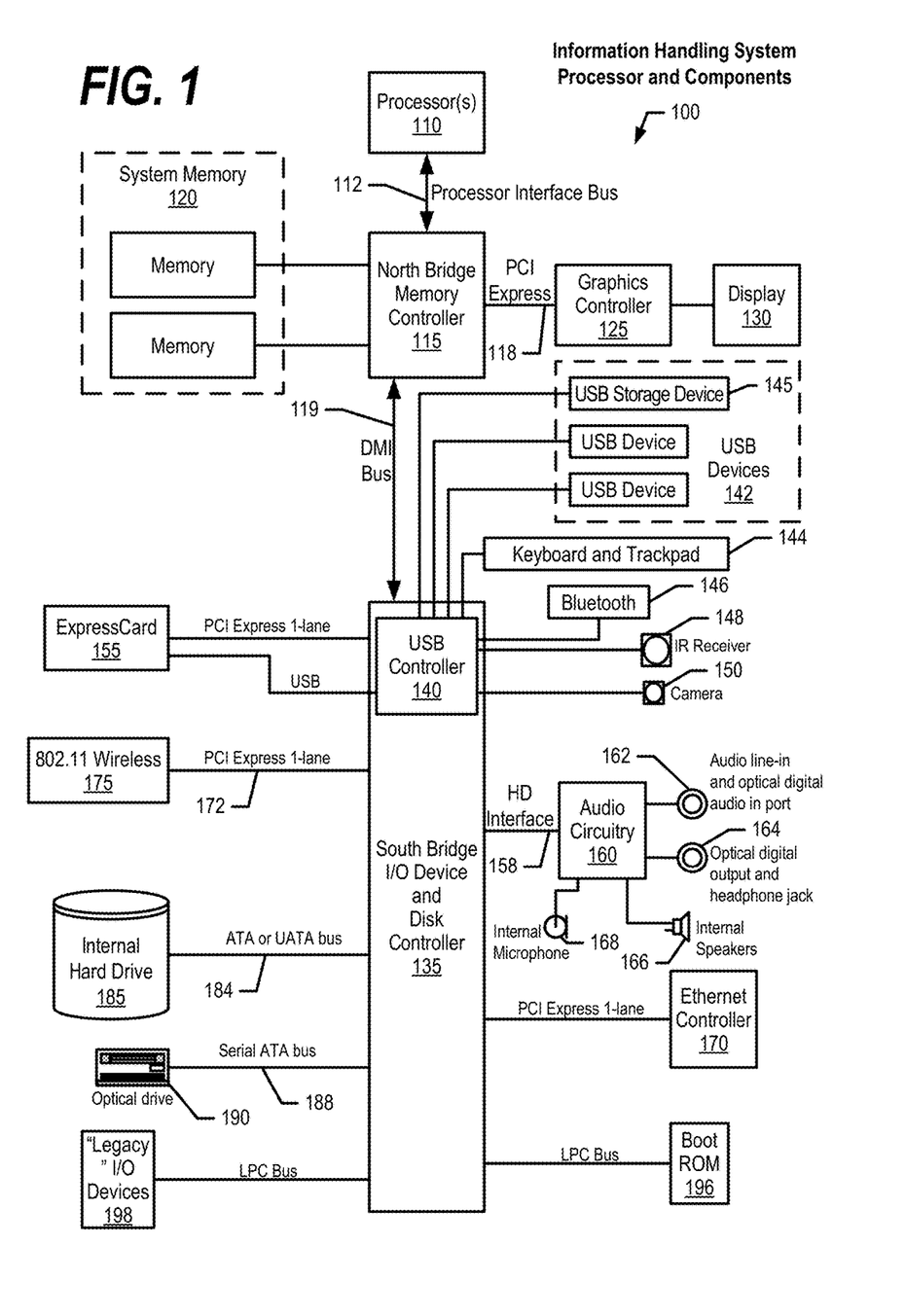
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
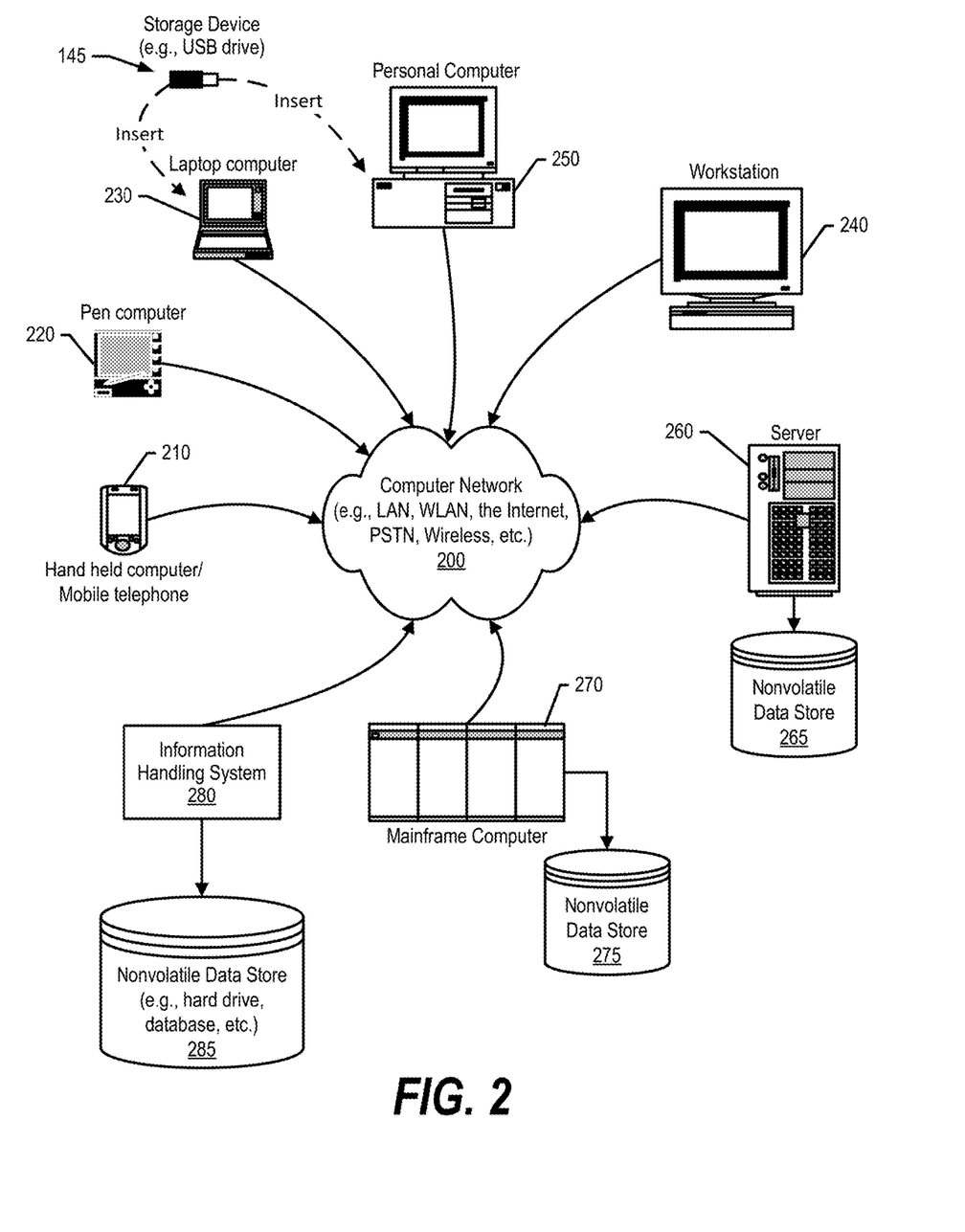
FIG. 2 provides an extension of the information handling system environment shown in FIG. 1 to illustrate that the methods described herein can be performed on a wide variety of information handling systems which operate in a networked environment

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 8 depict an approach that can be executed on an information handling system. In one embodiment, the information handling system partitions a corpus of documents into "slices" prior to query processing. Each slice includes a set of documents and the amount of documents in each slice is based on a facets per slice threshold. The information handling system also creates a facet index that logs the facets per document on a per-slice basis. As such, the information handling system recognizes the total amount of facets in each slice on a facet category basis, which the information handling system utilizes during complement facet counting discussed below.

When the information handling system receives a query, the information handling system first identifies documents in the corpus of documents that match the user query and then initiates a set of steps to dynamically partition the corpus of documents into sub-corpuses on a per-slice basis. The information handling system then computes document counting ratios for each sub-corpus, which is the amount of matching documents in the sub-corpus relative to the total amount of documents in the sub-corpus.

The information handling system continues to partition the sub-corpuses until each sub-corpus has a document counting ratio that favors either normal facet counting or complement facet counting. Normal facet counting involves counting facets corresponding to matching documents in a sub-corpus. Complement facet counting involves counting facets of non-matching documents in the sub-corpus and subtracting the result from the total amount of facets in the sub-corpus. When the information handling system reaches a point at which each of the sub-corpuses has a favorable document counting ratio, the information handling system performs normal facet counting or complement facet counting on each sub-corpus to determine the total facets corresponding to the matching documents on a facet category basis.

Figure 3:
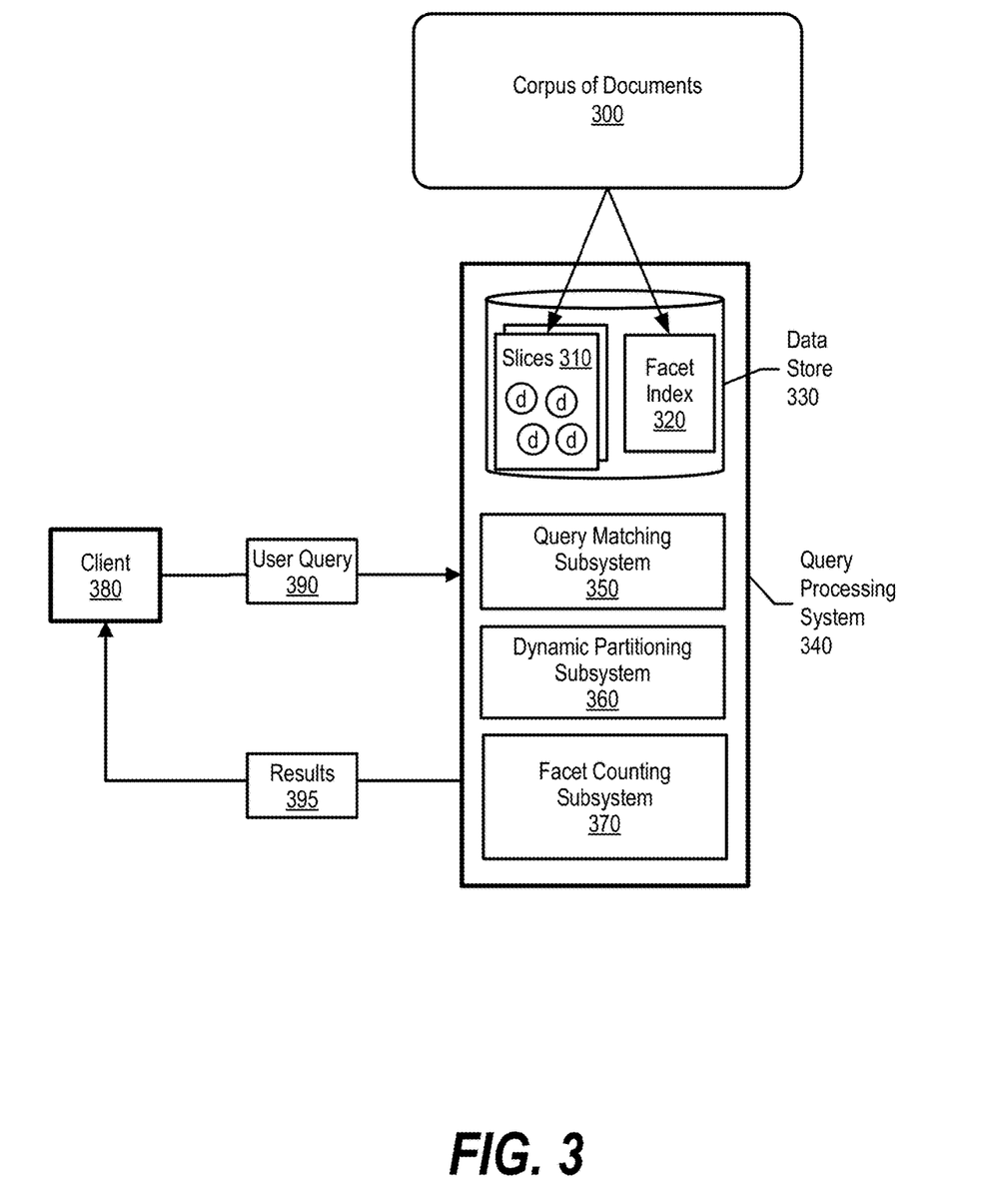
FIG. 3 is a diagram depicting a query processing system that dynamically adjusts sub-corpus sizes and performs normal facet counting and complement facet counting to provide a response to a user query.

FIG. 3 is a diagram depicting a query processing system that dynamically adjusts sub-corpus sizes and performs normal facet counting and complement facet counting to provide a response to a user query.

Query processing system 340 allocates documents in corpus of documents 300 into slices 310. Query processing system 340 determines the amount of documents "d" based on a facets per slice threshold. For example, if the facets per slice index is "20" and the each of the documents included four facets, then each slice would include five documents. During the slice allocation phase, query processing system 340 counts the number and type of facets in each document and stores the facet information in facet index 320 on a per-slice basis (see FIGS. 5, 6, and corresponding text for further details). As those skilled in the art can appreciate, documents typically have different amounts of facets.

When query processing system 340 receives user query 390 via client 380, query processing system 340 first identifies documents in corpus of documents 320 that match user query 390. Query processing system 340 also groups slices 310 into a set of initial sub-corpuses, which may be as simple as splitting the slices evenly over a pre-determined number of sub-corpuses. Dynamic partitioning subsystem 360 computes a document counting ratio for each sub-corpus based on the amount of matching documents in the sub-corpus relative to the total amount of documents in the sub-corpus. For example, if a sub-corpus included 20 documents and 15 documents matched, then the sub-corpus's document counting ratio would be 15/20=0.75.

Figure 4:
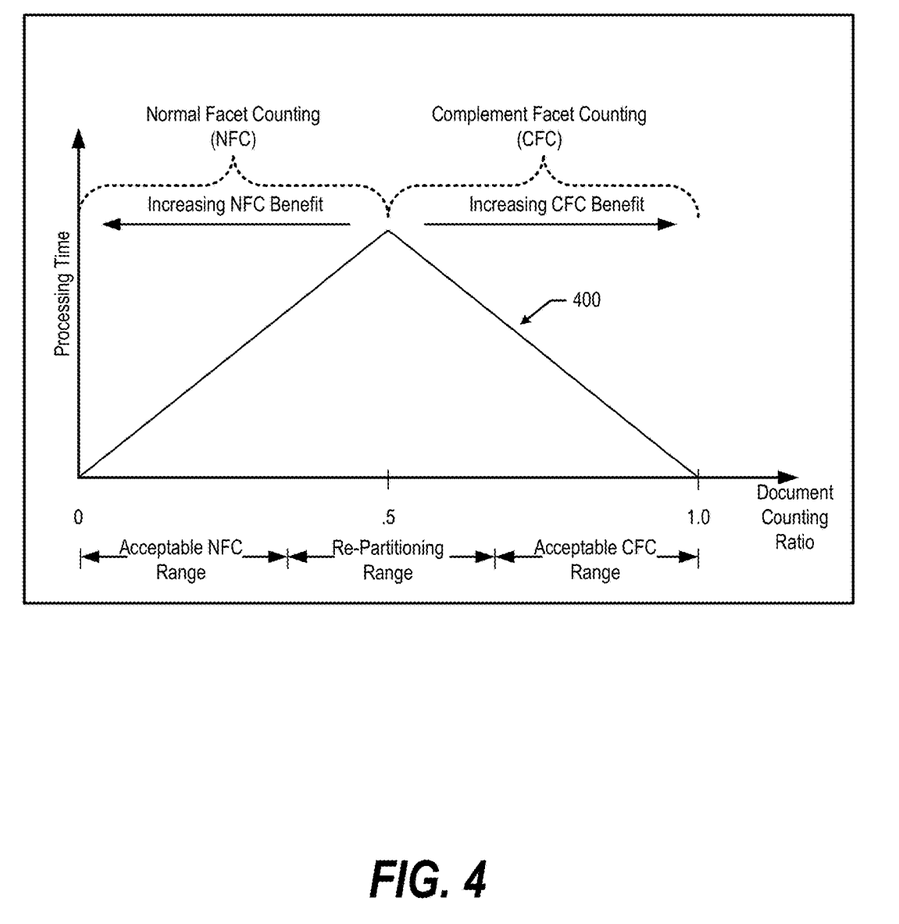
FIG. 4 is a diagram depicting a graph of the relative amount of processing time required to count facets of matching documents in a sub-corpus compared to the sub-corpus's document counting ratio.

As shown in FIG. 4 and discussed below, sub-corpuses having a document counting ratio close to 1.0 benefit (reduced processing time) from complement facet counting and sub-corpuses having a document counting ratio close to 0.0 benefit from normal facet counting. However, sub-corpuses having a document counting ratio close to 0.5 do not benefit much from either normal facet counting or complement facet counting. As such, when dynamic partitioning sub-system 360 identifies a sub-corpus whose document counting ratio is within a "re-partitioning range," dynamic partitioning sub-system 360 splits the sub-corpus into multiple sub-corpuses (e.g., two sub-corpuses) and re-computes their corresponding document counting ratios. Dynamic partitioning sub-system 360 continues to sub-divide the sub-corpuses, while keeping each slice intact, until each of the sub-corpuses' document counting ratios move outside the re-partitioning range and into an acceptable natural facet counting range or complement facet counting range.

Next, facet counting subsystem 370 performs normal facet counting or complement facet counting on each sub-corpus based on their corresponding document counting ratio. For example, a sub-corpus having a document counting ratio of 0.25 indicates that one out of four documents in the sub-corpus match user query 390. As such, natural facet counting is used to count the facets in the matching documents. In another example, a sub-corpus having a document counting ratio of 0.75 indicates that three out of four documents in the sub-corpus match user query. As such, complement facet counting is used to count the facets in the non-matching documents and the results are subtracted from the total amount of facets in the sub-corpus to determine the amount of facets in the matching documents.

As discussed herein, query processing system 340 uses facet index 320 to determine the amount of facets in each slice and, in turn uses the amount of facets in each slice to determine the amount of facets in each sub-corpus. Query processing system 340 then aggregates the amount and type of facets from each sub-corpus into results 395 and sends results 395 to client 380.

FIG. 4 is a diagram depicting a graph of the relative amount of processing time required to count facets of matching documents in a sub-corpus compared to the sub-corpus's document counting ratio. As discussed earlier, normal facet counting involves counting facets within a set of matching documents, and complement facet counting involves counting facets within a set of non-matching documents and subtracting the counted value from the total amount of facets within a set of documents to determine the number of facets within the matching documents.

FIG. 4 shows a graphical representation of when normal facet counting is beneficial versus complement facet counting based on a sub-corpus's document counting ratio. As can be seen, when the document counting ratio is 0.5, facet counting processing time 400 is the greatest because half of the documents require counting. The processing time decreases as the document counting ratio moves towards 0 using normal facet counting (the less amount of matching documents to count). The processing time also decreases as the document counting ratio moves towards 1.0 (the less amount of non-matching documents to count).

Query processing system 340 sets a re-partitioning range (e.g., 0.35 to 0.65) and sub-corpuses whose document counting ratios fall within that range are sub-divided into smaller sub-corpuses. Once each of the sub-corpus's document counting ratios are within an acceptable natural facet counting range or an acceptable complement facet counting range, then query processing system 340 proceeds to count facets in the sub-corpuses using normal facet counting or complement facet counting accordingly (see FIG. 7 and corresponding text for further details).

Figure 5:
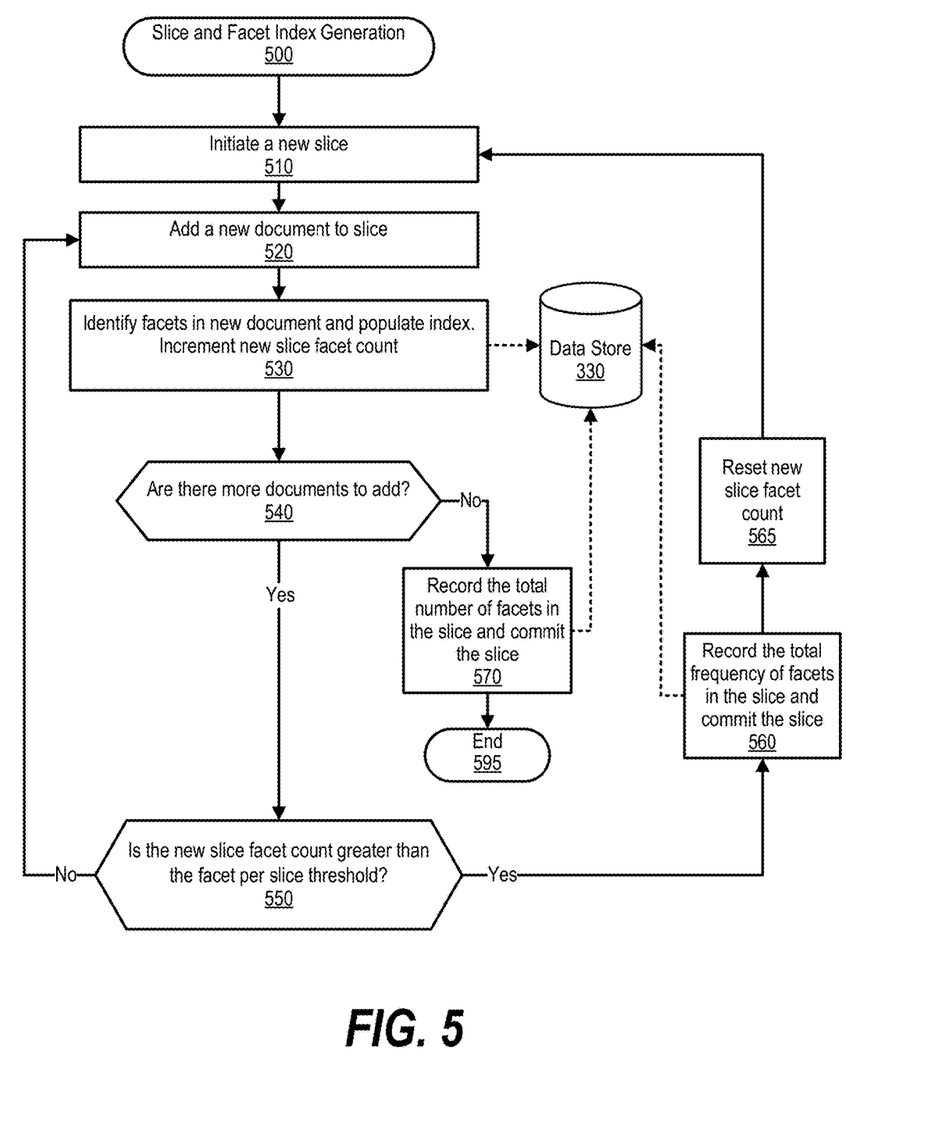
FIG. 5 is a flowchart depicting steps taken to partition a corpus of documents into slices and create a facet index that identifies facet information for each slice.

FIG. 5 is a flowchart depicting steps taken to partition a corpus of documents into slices and create a facet index that identifies facet information for each slice. FIG. 5 processing commences at 500 whereupon, at step 510, the process initiates a new slice and, at step 520, the process adds a new document to the new slice. At step 530, the process identifies the facets in the new document and populates facet index 320 accordingly (see FIG. 6 and corresponding text for further details). The process also increments the new slice facet count based on the number of facets found in the new document.

The process determines as to whether there are there more documents to analyze in corpus of documents 300 (decision 540). If are there more documents to add, then decision 540 branches to the 'yes' branch whereupon the process determines as to whether the new slice facet count (the amount of facets in the current slice) is greater than a facet per slice threshold, which may be pre-determined (decision 550). If the new slice facet count is not greater than the facet per slice threshold, then decision 550 branches to the 'no' branch, which loops back to add another document to the current slice. This looping continues until the new slice facet count has reached the facet per slice threshold, at which point decision 550 branches to the 'yes branch exiting the loop.

At step 560, the process records, in facet index 320, the total amount of facets in the slice by facet type, and commits the slice. At step 565, the process resets the new slice facet count and initiates a new slice at step 510.

Referring back to decision 540, when the process has finished adding each of the documents to a slice, decision 540 branches to the 'no' branch whereupon the process records, in facet index 320, the total amount of facets in the slice by facet type, and commits the slice. In one embodiment, the last slice may not have enough documents to reach the facet per slice threshold. FIG. 5 processing thereafter ends at 595.

Facet index 320 now includes a list of facets in each document in each slice. Query processing system 340 also knows at this point the total number of facets by type in each document in each slice, which is utilized to determine the total number of facets by type for each sub-corpus (see FIG. 7 and corresponding text for further details).

Figure 6:
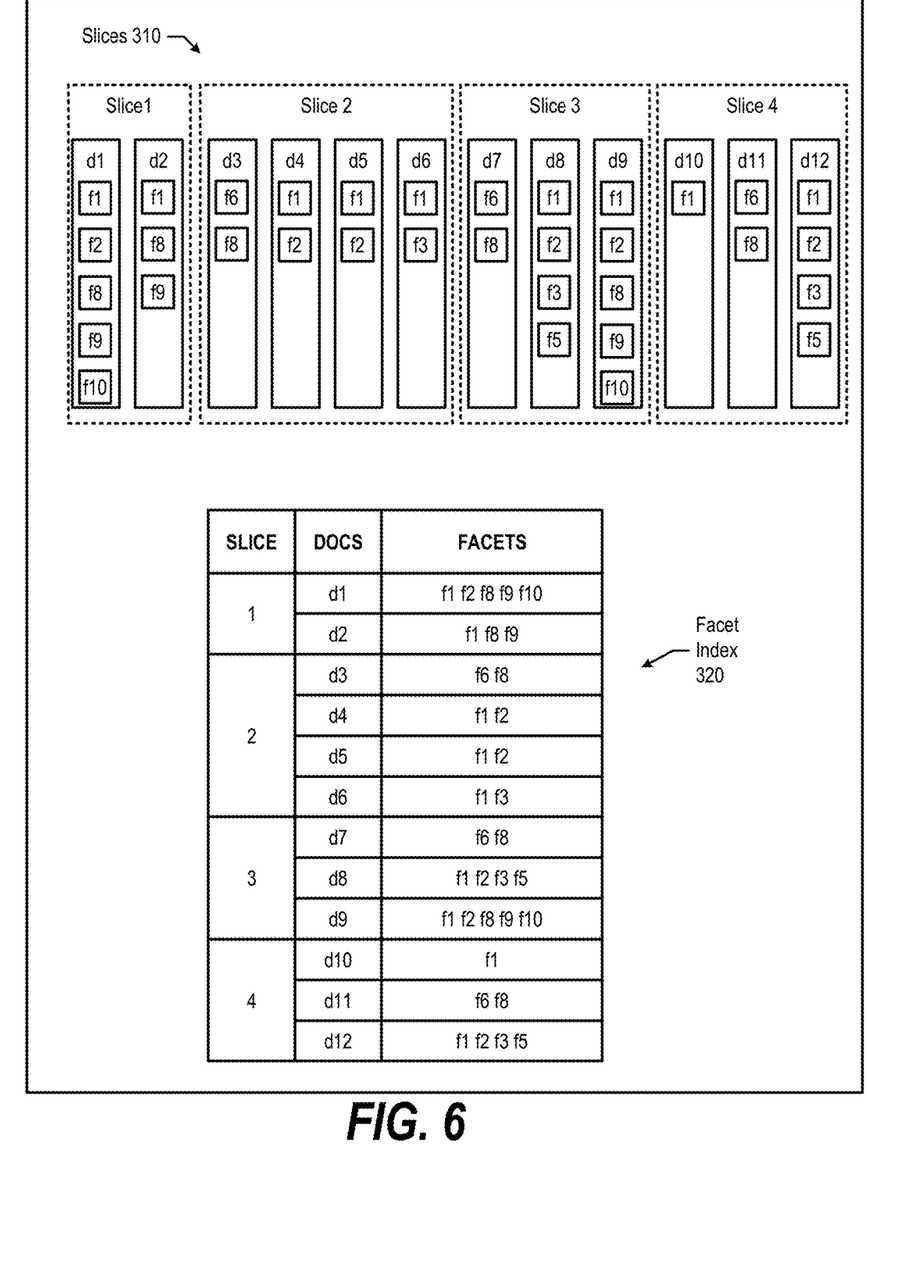
FIG. 6 is a diagram depicting documents from a corpus of documents partitioned into slices and a facet index that tracks facet information of each slice.

FIG. 6 is a diagram depicting documents from corpus of documents 300 partitioned to slices and a facet index that tracks facet information of each slice. Corpus of documents 300 (or a section of) is divided into four slices 310 based on, for example, a facet per slice threshold of eight. Slice 1 includes document 1, which includes facets 1, 2, 8, 9, and 10 (five facets), and document 2, which includes facets 1, 8, and 9 (three facets), for a total of eight facets. Slice 2 includes documents 3, 4, 5, and 6, each including two facets for a total of eight facets.

Slice 3 includes document 4 (two facets), document 8 (four facets), and document 9 (five facets), for a total of eleven facets. Slice 3 includes more than eight facets because document 9's facets reached the facets per slice threshold but documents are not sub-divided. Slice 4 includes document 10 (one facet), document 11 (two facets), and document 12 (four facets), for a total of seven facets. If corpus of documents 300 includes a document 13, the process would include the document in slice 4 because the total amount of slice 4's facets has not reached the facet per slice threshold of eight.

Facet index 320 is shown in tabular form and shows each slice, its corresponding documents, and corresponding facets. In turn, query processing system 340 knows which slices include which facets and uses facet index 320 during facet counting steps (see FIG. 7 and corresponding text for further details).

Figure 7:
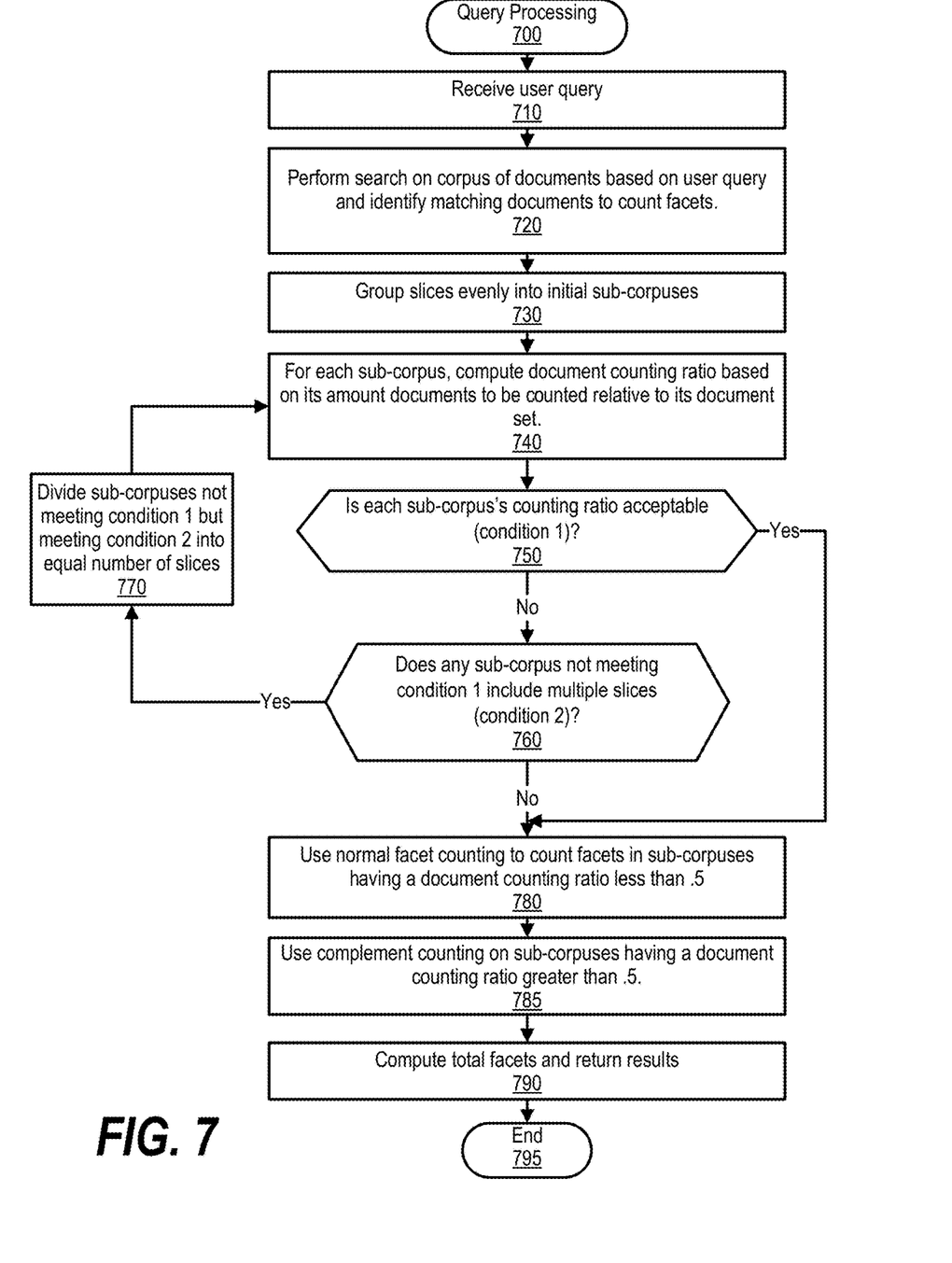
FIG. 7 is a flowchart depicting steps taken to segment a corpus of documents into sub-corpuses for facet counting optimization.

FIG. 7 is a flowchart depicting steps taken to segment a corpus of documents into sub-corpuses for facet counting optimization. FIG. 7 processing commences at 700 whereupon, at step 710, the process receives a user query, such a search request for documents corresponding to a topic or keywords. At step 720, the process performs a search on corpus of documents 300 and identifies matching documents. For example, the search request may be "smartphones" and the process identifies documents within corpus of documents 300 that correspond to smartphones.

At step 730, the process groups the slices (created in FIG. 5) evenly into initial sub-corpuses. In one embodiment, the process groups the slices into initial sub-corpuses prior to receiving the user query. At step 740, for each sub-corpus, the process computes a document counting ratio based on its amount of documents to be counted (matching documents from step 720) relative to its total amount of documents. For example, if a sub-corpus includes six slices that each include five documents (30 total documents), and ten of the documents in the sub-corpus match the user query, then the sub-corpus's document counting ratio is 10/30, or 0.33.

The process determines as to whether is each sub-corpus's document counting ratio is acceptable (e.g., condition 1) (decision 750). As discussed above with respect to FIG. 4, acceptable document counting ratios may be from 0 to 0.35 and from 0.65 to 1.0. If each of the sub-corpuses document counting ratios are acceptable, then decision 750 branches to the 'yes' branch bypassing sub-corpus partitioning steps. On the other hand, if any of the sub-corpus's document counting ratios are not acceptable, then decision 750 branches to the 'no' branch. The process determines as to whether any sub-corpuses not meeting condition 1 includes multiple slices (condition 2) (decision 760). For example, one sub-corpus may have a 0.55 document counting ration and include four slices. In this example, the sub-corpus may be divided into two sub-corpuses with two slices each. However, if the sub-corpus only has one slice, the sub-corpus cannot be divided any further.

If any sub-corpuses not meeting condition 1 includes multiple slices (condition 2), then decision 760 branches to the 'yes' branch which loops back to divide the sub-corpuses not meeting condition 1, but meeting condition 2, into an equal number of slices. This looping continues until each sub-corpus includes a document counting ratio that is acceptable (meeting a document counting ratio threshold), or until a sub-corpus only includes a single slice, at which point decision 760 branches to the 'no' branch exiting the loop.

Figure 8:
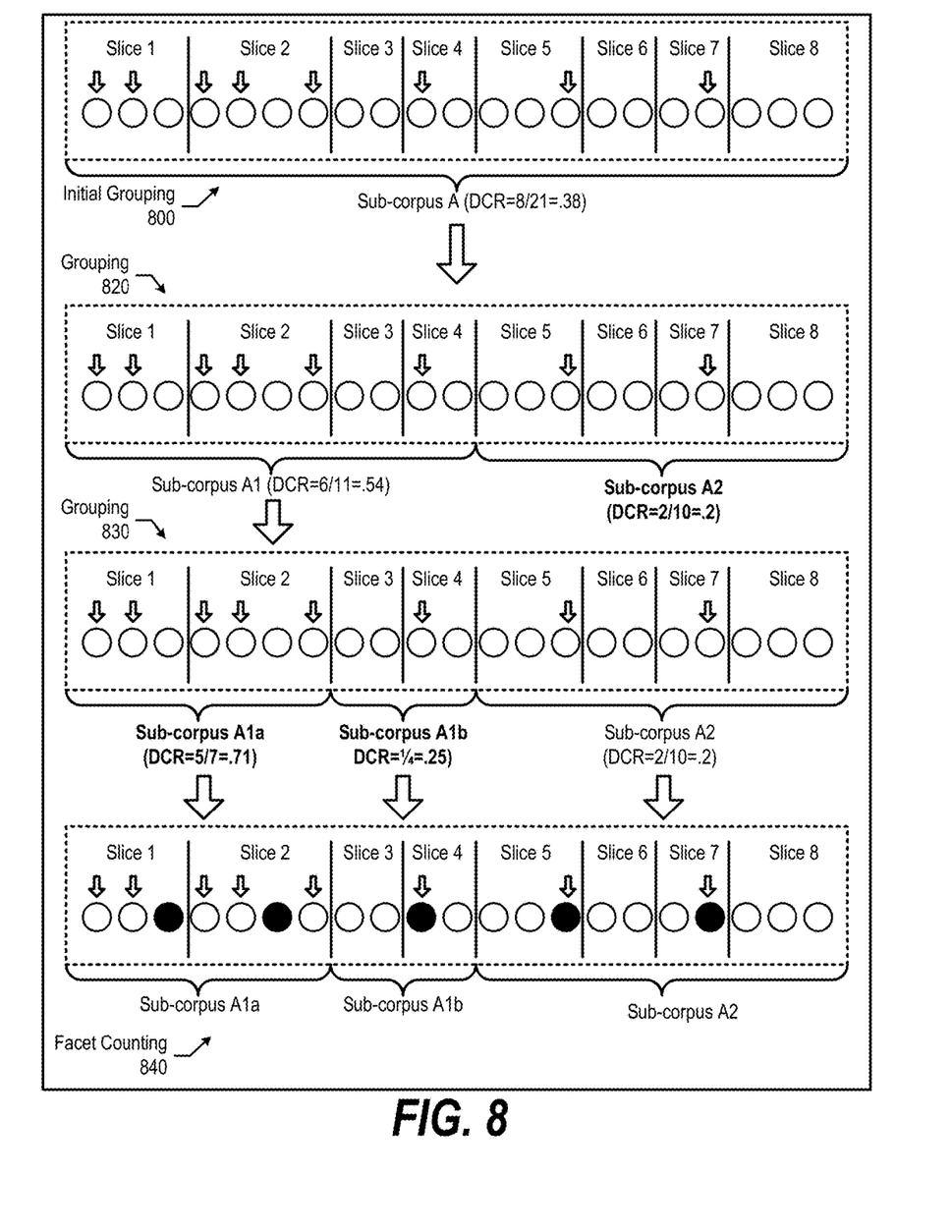
FIG. 8 is a diagram depicting an example of a query processing system dividing sub-corpuses based on their corresponding document counting ratios.

At step 780, the process uses normal facet counting to count facets by facet type in sub-corpuses having a document counting ratio less than 0.5. Referring to FIG. 8, sub-corpus A1$b$ includes one out of four matching documents (arrows indicate matching documents), which results in a document counting ratio of 0.25. Therefore, the process uses normal facet counting on sub-corpus A1$b$.

At step 785, the process uses complement facet counting to count facets by facet type in sub-corpuses having a document counting ratio greater than 0.5. Referring to FIG. 8, sub-corpus A1$a$ includes five out of seven matching documents, which results in a document counting ratio of 0.71. Therefore, the process uses complement facet counting to count the facets in the two non-matching documents and subtracts the results from the total amount of facets included in sub-corpus A1$a$ (obtained from analyzing slice 1 and slice 2 facet information stored in facet index 320. As a result, the process is able to reduce processing time by counting facets in two documents instead of having to count the five matching documents.

At step 790, the process computes the total number of facets by facet type from steps 780 and 785 and returns the results to the user. FIG. 7 processing thereafter ends at 795.

FIG. 8 is a diagram depicting an example of query processing system 340 dividing sub-corpuses based on their corresponding document counting ratios. The example in FIG. 8 pertains to 21 documents in a corpus (represented by circles), and some of the 21 documents have been matched to a query (represented by arrows). Initial grouping 800 shows that slices 1, 2, 3, 4, 5, 6, 7, and 8 have been grouped into sub-corpus A. Sub-corpus A includes eight matching documents out of 21, which equates to a document counting ratio (DCR) of 8/21=0.38. Assuming that an acceptable document counting ratio is less than or equal to 0.35 or greater than or equal to 0.65, sub-corpus A requires sub-dividing.

Grouping 820 is the result of query processing system 340 sub-dividing sub-corpus A, which splits sub-corpus A into sub-corpus A1 (slices 1 through 4) and sub-corpus A2 (slices 5 through 8). Sub-corpus A1 includes six matching documents out of 11 documents, for a document counting ratio of 6/11=0.54. As such, sub-corpus A1 requires further sub-dividing (discussed below). However, sub-corpus A2 includes two matching documents out of ten, for a document counting ratio of 2/10=0.2. As such, sub-corpus A2's document counting ratio is acceptable and requires no further sub-dividing.

Referring back to sub-corpus A1, query processing system 340 splits sub-corpus A1 into sub-corpus A1*a* and sub-corpus A1*b*. Sub-corpus A1*a* includes five out of seven matching documents, resulting in a document counting ratio of 5/7=0.71, which is an acceptable level for complement facet counting. Sub-corpus A1*b* includes one out of four matching documents, resulting in a document counting ratio of 1/4=0.25, which is an acceptable level for normal facet counting. At this point, each sub-corpus corresponds to an acceptable document counting ratio.

Next, query processing system 340 performs facet counting by facet type on each of the sub-corpuses (facet counting 840, the counted documents are in black). Query processing system 340 performs complement facet counting on sub-corpus A1*a*, which counts the number of facets by facet type in the two non-matching documents and subtracts the result from the total amount of facets by facet type in slices 1 and 2. Query processing system 340 performs normal facet counting on sub-corpus A1*b* and counts the number of facets by facet type in the one document that matches. Similarly, query processing system 340 performs normal facet counting on sub-corpus A2 and counts the number of facets in the two matching documents. Query processing system 340 then aggregates the number of facets by facet type and provides the total number of facets by facet type for the matching documents to the user (results 395).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   a set of computer program instructions stored in the memory and executed by at least one of the processors in order to perform actions of:
   assigning each of a plurality of documents in a corpus of documents to one of a plurality of slices based on a facets per slice threshold;
   matching a set of the plurality of documents in the corpus of documents to a query received from a client;
   determining an amount of facets included in the matching set of documents, wherein the determining comprises dynamically dividing the corpus of documents into a plurality of sub-corpuses and performing complement facet counting on at least one of the plurality of sub-corpuses, and wherein the dynamically dividing the corpus of documents into the plurality of sub-corpuses further comprises:
   assigning each of the plurality of slices to a plurality of initial sub-corpuses;
   computing a document counting ratio for each of the plurality of initial sub-corpuses, wherein, for each initial sub-corpus, the document counting ratio indicates a ratio of an amount of the set of matching documents in the initial sub-corpus compared to a total amount of documents in the initial sub-corpus; and
   dynamically sub-dividing each of the plurality of initial sub-corpuses into smaller sub-corpuses until each of the smaller sub-corpuses reaches a document counting ratio threshold or comprises a single one of the plurality of slices; and
   sending a set of results to the client that includes the determined amount of facets corresponding to the set of matching documents.

2. The information handling system of claim 1 wherein the processors perform additional actions comprising:
   adding a first document from the corpus of documents to a first one of the plurality of slices;
   incrementing a slice facet count based on an amount of facets in the first document;
   determining whether the slice facet count reaches the facet per slice threshold; and
   in response to determining that the slice facet count has not reached the facet per slice threshold, adding a second document from the corpus of documents to the first slice; and
   in response to determining that the slice facet count has reached the facet per slice threshold, adding the second document to a second one of the plurality of slices.

3. The information handling system of claim 2 wherein the processors perform additional actions comprising:
   logging the slice facet count of the first slice in response to determining that the slice facet count has reached the facet per slice threshold, wherein the logging comprises logging an amount of facets per facet type that are included in the slice.

4. The information handling system of claim 1 wherein the processors perform additional actions comprising:
   determining that a first one the document counting ratios corresponding to a first one of the initial sub-corpuses does not reach a document counting ratio threshold;
   sub-dividing the first initial sub-corpus into a second sub-corpus and a third sub-corpus;
   computing a second document counting ratio for the second sub-corpus and computing a third counting ratio for the third sub-corpus; and
   determining whether the second document counting ratio and the third document counting ratio reaches the document counting threshold.

5. The information handling system of claim 4 wherein the processors perform additional actions comprising:

performing complement facet counting on the second sub-corpus in response to determining that the second document counting ratio is greater than 0.5; and performing normal facet counting on the third sub-corpus in response to determining that the third document counting ratio is less than 0.5.

6. A computer program product stored in a non-transitory computer readable storage medium, comprising computer program code that, when executed by an information handling system, causes the information handling system to perform actions comprising:

assigning each of a plurality of documents in a corpus of documents to one of a plurality of slices based on a facets per slice threshold;

matching a set of the plurality of documents in the corpus of documents to a query received from a client;

determining an amount of facets included in the matching set of documents, wherein the determining comprises dynamically dividing the corpus of documents into a plurality of sub-corpuses and performing complement facet counting on at least one of the plurality of sub-corpuses, and wherein the dynamically dividing the corpus of documents into the plurality of sub-corpuses further comprises:

assigning each of the plurality of slices to a plurality of initial sub-corpuses;

computing a document counting ratio for each of the plurality of initial sub-corpuses, wherein, for each initial sub-corpus, the document counting ratio indicates a ratio of an amount of the set of matching documents in the initial sub-corpus compared to a total amount of documents in the initial sub-corpus; and dynamically sub-dividing each of the plurality of initial sub-corpuses into smaller sub-corpuses until each of the smaller sub-corpuses reaches a document counting ratio threshold or comprises a single one of the plurality of slices; and sending a set of results to the client that includes the determined amount of facets corresponding to the set of matching documents.

7. The computer program product of claim 6 wherein the information handling system performs further actions comprising:

adding a first document from the corpus of documents to a first one of the plurality of slices;

incrementing a slice facet count based on an amount of facets in the first document;

determining whether the slice facet count reaches the facet per slice threshold; and in response to determining that the slice facet count has not reached the facet per slice threshold, adding a second document from the corpus of documents to the first slice; and in response to determining that the slice facet count has reached the facet per slice threshold, adding the second document to a second one of the plurality of slices.

8. The computer program product of claim 7 wherein the information handling system performs further actions comprising:

logging the slice facet count of the first slice in response to determining that the slice facet count has reached the facet per slice threshold, wherein the logging comprises logging an amount of facets per facet type that are included in the slice.

9. The computer program product of claim 6 wherein the information handling system performs further actions comprising:

determining that a first one the document counting ratios corresponding to a first one of the initial sub-corpuses does not reach a document counting ratio threshold;

sub-dividing the first initial sub-corpus into a second sub-corpus and a third sub-corpus;

computing a second document counting ratio for the second sub-corpus and computing a third counting ratio for the third sub-corpus; and determining whether the second document counting ratio and the third document counting ratio reaches the document counting threshold.

10. The computer program product of claim 9 wherein the information handling system performs further actions comprising:

performing complement facet counting on the second sub-corpus in response to determining that the second document counting ratio is greater than 0.5; and performing normal facet counting on the third sub-corpus in response to determining that the third document counting ratio is less than 0.5.

* * * * *